Jan. 31, 1956 WAYNE H. CHEN 2,733,424

CONNECTOR AND SELECTOR CIRCUITS

Filed Sept. 15, 1954

INVENTOR
W. H. CHEN
BY
ATTORNEY

United States Patent Office 2,733,424

Patented Jan. 31, 1956

2,733,424

CONNECTOR AND SELECTOR CIRCUITS

Wayne H. Chen, Rego Park, N. Y., assignor to Bell Telephone Laboratories, Incorporated, New York, N. Y., a corporation of New York Application September 15, 1954, Serial No. 456,291

8 Claims. (Cl. 340—147)

Figure 1:
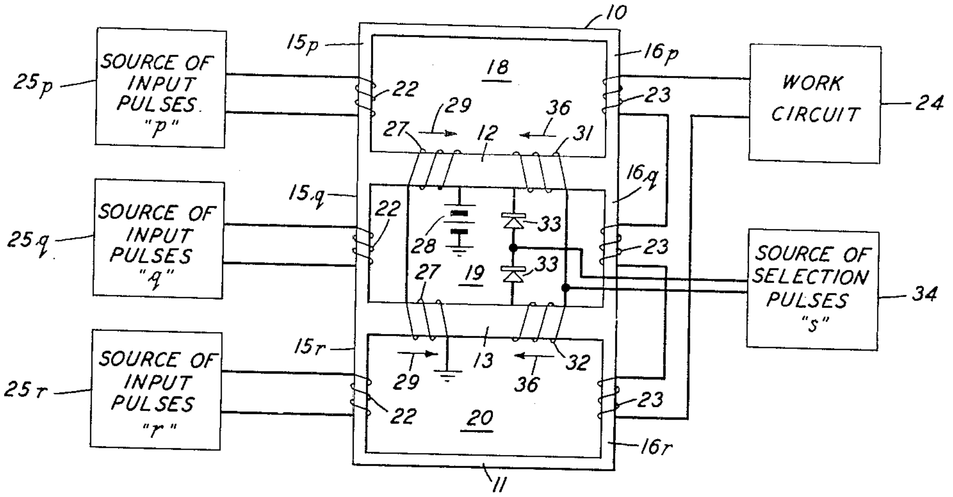

This invention relates to selector and connector circuits and more particularly to such circuits capable of selectively transmitting the information from any one of three input locations to any one or more output locations.

In application Serial No. 456,282, filed September 15, 1954, of W. H. Chen and C. Lee, certain logical operators are disclosed for three-state logic systems. As there discussed, switching networks have generally been utilized and analyzed as two-valued transmission, two-valued switching networks, employing such algebras as Boolean algebra, which is described, inter alia, in Chapter 5 of "The Design of Switching Circuits" by W. Keister, A. E. Ritchie, and S. H. Washburn, D. Van Nostrand Co., New York, 1951. However, any $n$-valued transmission, $n$-valued switching networks can be analyzed by an algebra based upon that introduced by E. L. Post, "Introduction to a General Theory of Elementary Propositions," American Journal of Mathematics, vol. 43, pages 163–185, 1921, and hence generally referred to as Post algebra.

By means of various diode connective circuits and the types of operators described in the above-mentioned application, any Post function of $n$ values can be expressed. Specifically in the above-mentioned application, circuits are described which serve as operators in three-state logic systems where the ternary values "1," "2," and "3" are defined, respectively, as a positive pulse, no pulse, and a negative pulse.

In synthesizing three-state logic functions, another type of circuit is of considerable value, which circuit we shall define as a T-connective. A T-connective, for a three-state or three-valued system, has three inputs, $p$, $q$, and $r$, each of which may assume any of three ternary values "1," "2" and "3," a control input $s$, which also may assume any of the three ternary values, and an output circuit. By means of the T-connective circuit one of the inputs $p$, $q$, or $r$ is connected or switched to the output circuit depending on the ternary value of $s$. The T-connective is thus a four input gate the output of which assumes the values of $p$, $q$, or $r$ according as $s$ assumes the ternary values "1," "2," or "3."

It is a general object of this invention to provide an improved selector and connector circuit for connecting any one of three inputs selectively to any one or more output circuits.

It is another object of this invention to provide an improved gating circuit for employment in three-state logic circuits.

In a specific illustrative embodiment of this invention, a gating circuit comprises a magnetic core having two outer and two inner legs, the inner legs being of larger cross-sectional area than the outer legs. The magnetic core thus defines three distinct magnetic circuits having certain common path elements. An input winding is coupled to each of the magnetic circuits, the input windings being connected respectively to sources of input information $p$, $q$, and $r$. Each of the inputs $p$, $q$, and $r$ may advantageously have any of the three ternary values "1," "2," or "3," defined by a positive pulse, no pulse, or a negative pulse, respectively.

The two inner legs, of larger cross section, have a saturating flux flowing through them which is normally sufficient to saturate the two outer magnetic circuits but not the central magnetic circuit. A control winding is wound on each of the two inner legs and connected in series with a diode or other unidirectional current element; a control signal $s$, which may also assume any of the three ternary values, is applied to the control windings. Advantageously the diodes are so arranged that a control signal $s=1$, for a positive control pulse, is applied to only one of the control windings and a control signal $s=3$, for a negative pulse, is applied to only the other of the control windings.

When a control signal $s$ is applied to a control winding it generates a flux in opposition to the saturating flux in that inner leg of the magnetic core. This effectively cancels the saturating flux flowing in that leg and thus flowing in the outer magnetic circuit of the core of which that leg is a part. The outer magnetic circuit can now act as a transformer to let the input appearing at the input winding coupled to that outer magnetic circuit appear at the output winding thereof. At the same time the removal of the saturating flux from one outer magnetic circuit causes the central magnetic circuit to become saturated and prevent it from letting information through that would appear at its input winding.

Advantageously, a gating circuit in accordance with this invention can be employed bidirectionally for a transmission of ternary information pulses either from a plurality of inputs to a single output, under the control of ternary control signals, or from a single input to a plurality of outputs, under control of the other ternary control signals.

Further in accordance with another specific illustrative embodiment of this invention, two of these gating circuits may be connected in tandem so that a ternary input pulse appearing at any one of three inputs may be transmitted or gated to any of three outputs under control of a pair of ternary control signals.

It is a feature of this invention that a gating circuit comprise a magnetic core defining three magnetic circuits and having a pair of outer legs and a pair of inner legs of larger cross section than the outer legs and normally having flowing therein a flux sufficient to saturate the outer legs but not the inner legs.

It is a further feature of this invention that ternary control signals be applied to the inner legs selectively to generate a flux in the inner legs to cancel the saturating flux flowing therein, whereby one or the other of outer magnetic circuits is no longer saturated and can transmit input information appearing at an input winding coupled thereto to an output winding coupled thereto. When the saturating flux flowing in either of the inner legs is canceled in this manner and one of the outer magnetic circuits no longer is saturated, the saturating flux from the other inner leg serves to saturate the central magnetic circuit and prevent it from transmitting information appearing at its input winding to an output winding coupled thereto.

It is another feature of this invention that a gating circuit comprise three magnetic circuits having certain common paths and having a saturating flux flowing therein such that for any ternary value of a control signal applied to the gating circuit one and only one of the three magnetic circuits is not saturated and can transmit ternary information appearing at an input coupled thereto to an output coupled thereto.

It is still another feature of one embodiment of this invention that two ternary gating circuits in accordance with this invention be connected in tandem, the output winding coupled to each magnetic circuit of the first gating circuit being connected to an input winding on each of the three magnetic circuits of the second gating circuit whereby information appearing at any of three input windings can be gated to any one of three output circuits under the control of two ternary control signals.

Figure 2:
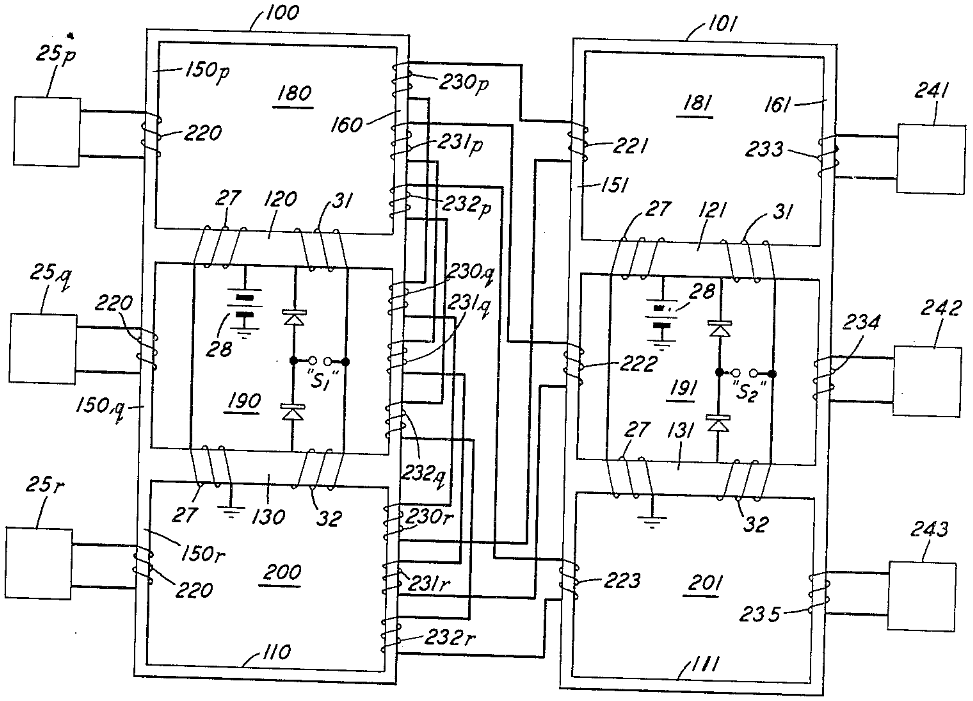

A complete understanding of this invention and of these and other features thereof may be gained from consideration of the following detailed description and the accompanying drawing, in which:

Fig. 1 is a schematic representation of one specific embodiment of this invention; and Fig. 2 is a schematic representation of another specific embodiment of this invention for connecting any one of three input information sources to any one of three output circuits under control of two ternary control signals.

The specific illustrative embodiment depicted in Fig. 1 is a selector and connector circuit that operates to switch information from any one of three inputs to a single work circuit under control of three-state selection. As there seen, the circuit comprises a magnetic structure having two outer legs 10 and 11 and two inner legs 12 and 13, the legs being joined on one side by the end pieces 15*p*, 15*q*, and 15*r* and on the other side by the end pieces 16*p*, 16*q*, and 16*r*. The inner legs 12 and 13 are of larger cross-sectional area than the outer legs 10 and 11 and advantageously are of over twice the cross-sectional area. The legs 10, 11, 12 and 13 and the end pieces 15 and 16 thus define three magnetic circuits 18, 19, and 20, each two adjacent circuits sharing the inner legs 12 and 13 as common path elements thereof.

Each of the magnetic circuits 18, 19 and 20 has an input winding 22 and an output winding 23 coupled thereto. In this specific embodiment each of the input windings is connected to a distinct source of three-state input pulses 25, respectively identified as sources for the input signals "*p*," "*q*," and "*r*." The output windings 23, in this specific embodiment, are connected in series and to a work circuit 26.

Each of the inner legs 12 and 13 has a saturating winding 27 wound thereon, the saturating windings being connected in series between a source 28 of direct current potential and ground. Saturating flux, in this specific embodiment, is thus generated in each of the inner legs in the direction indicated by the arrows 29. This flux serves to saturate the outer magnetic circuits 18 and 20 by saturating the legs 10 and 11 and the end elements 15*p*, 16*p*, 15*r*, and 16*r*. The inner magnetic circuit 19 is not saturated as the inner legs 12 and 13 are of sufficient cross-sectional area not to be saturated by the saturating flux and the effects of the saturating flux in the end elements 15*q* and 16*q* cancel each other out.

On each of the inner legs 12 and 13 is also wound control or selection windings 31 and 32, respectively, the two windings 31 and 32 being connected, through diodes or other unidirectional current elements 33 to a source 34 of three-state selection pulses "*s*." The selection pulses "*s*" may have the three states comprising a positive pulse, which has a ternary value "1," no pulse, which has a ternary value "2," or a negative pulse, which has a ternary value "3." A positive selection pulse, $s=1$, is applied to selection winding 31 only and a negative selection pulse, $s=3$, is applied to selection winding 32 only. Each of these selection pulses generates a flux in the inner leg 12 or 13 in a direction, as indicated by the arrows 36, to oppose the saturating flux.

Each of the input pulses may similarly assume any of the three ternary values "1," "2," and "3." In accordance with an aspect of this invention, which of the input pulses is switched or gated to the work circuit 24 will depend on the state of the selection pulse "*s*." Advantageously, the value or state of the three input pulses *p*, *q*, and *r*, is constantly changing due to the operation of the circuitry associated with the input pulse sources 25, but at any time *p*, *q*, and *r* each has one of the three ternary values and similarly *s*, at any time, has one of the three ternary values "1," "2," or "3."

If the value of *s* is "1," a positive selection pulse is applied to the selection winding 31 through diode 33; no pulse is applied to the winding 32 as the diode 33 is in series therewith. The flux generated by the selection pulse will be in the direction indicated by arrow 36 opposing the saturating flux. The amount of the flux due to the selection pulse will be sufficient so that the other paths of the outer magnetic circuit 18, namely, the end elements 15*p* and 16*p* and the outer leg 10, are no longer saturated. Accordingly, circuit 18 can act as a transformer to transfer whatever information is applied to the input winding 22, from source 25*p*, to the output winding 23 and thence to the work circuit 24. The outer magnetic circuit 20 will not be affected and its magnetic elements will remain saturated due to the saturating flux flowing through the inner leg 13.

The inner magnetic circuit 19 was priorly a transformer, as neither the legs 12 or 13 is saturated by the saturating flux flowing therein and the saturating flux from these two windings cancel in the end elements 15*q* and 16*q*. Now, however, there is no saturating flux from leg 12. Accordingly, the saturating flux flowing out of leg 13 now saturates the elements 15*q* and 16*q* and prevents any information present at the input winding 22 from source 25*q* appearing at the output winding of circuit 19.

Accordingly, when $s=1$, only the information from input source 25*p* is applied to an output winding 23 and thus to the work circuit 24.

When $s=2$, no selection pulse is applied to the selection windings 31 and 32. Therefore the circuit remains in its original state with the two outer circuits 18 and 20 blocked as their magnetic elements are saturated and the inner circuit 19 acting as a transformer so that any information from source 25*q* is applied to the work circuit 24.

The situation when $s=3$ is just the converse of that described above for $s=1$. In this case a negative selection pulse is applied to the winding 32 through its diode 33 and generates a flux in opposition to the saturating flux in the inner legs 13. Outer magnetic circuit 20 can now act as a transformer to pass information from source 25*r* to the work circuit 24 and the inner magnetic circuit 19 is blocked due to saturating flux from the inner leg 12 saturating the end elements 15*q* and 16*q*. The other outer magnetic circuit 18 of course remains saturated for $s=3$.

In the above-described embodiment, it has been assumed that it is desired to apply three-state information from any one of three input sources to a single work circuit. It is apparent, however, that various modifications may be made in the operation and employment of the circuit within the scope of the invention. Thus information can readily be transferred in the opposite direction, from a single source through a winding 23 to one of three output circuits connected individually to windings 22. Similarly each magnetic circuit may have distinct input and output circuits not connected or associated with the input and output circuits of the other magnetic circuits. In such a case information will be transferred from one input source to its unique work circuit while the information from the other two input sources is blocked from their respective work circuits.

In Fig. 2 there is depicted schematically another specific illustrative embodiment of this invention wherein the information at any one of three input pulse sources 25 can be switched to any one of three work circuits 241, 242, or 243 under control of two selection pulses $s_1$ and $s_2$. In the drawing, elements identical with those disclosed in Fig. 1 have been referred by the same reference numeral or by adding a digit to the reference numeral utilized for the embodiment disclosed in Fig. 1.

In this embodiment two selector and connector circuits are connected in tandem, the first circuit including the three magnetic circuits 180, 190, and 200 defined by the inner legs 120 and 130, the outer legs 100 and 110, and the end elements 150 and 160 and the second circuit including the three magnetic circuits 181, 191, and 201 defined by the inner legs 121 and 131, the outer legs 101 and 111, and the end elements 151 and 161. An input winding 220 is associated with each of the first magnetic circuits 180, 190, and 200 and an output winding 233, 234, and 235, associated with each of the second magnetic circuits 181, 191, and 201, respectively. Additionally, each of the first magnetic circuits has three output windings 230, 231, and 232 coupled thereto. The three output windings 230 are connected in series with an input winding 221 of the magnetic circuit 181; the three output windings 231 are connected in series with an input winding 222 of the magnetic circuit 191; and the three output windings 232 are connected in series with an input winding 223 of the magnetic circuit 201.

Information from only one of the input sources 25 is transferred by the first group of magnetic circuits under control of the selection pulse $s_1$. This information is applied to all three magnetic circuits 181, 191, and 201. It is only transferred to one of the work circuits 241, 242, or 243, however, under control of the selection pulse $s_2$. Thus the selection pulse $s_1$ determines the source of the information to be passed by the circuit and the selection pulse $s_2$ determines the work circuit to which that information is to be applied.

It should be noted that the same operation may be attained if the circuits 180, 190, and 200 each has only a single output winding 23 but the circuits 181, 191, and 201 each has three input windings 22 which are connected in three groups so that each output winding 23 is connected to an input winding 22 coupled to each of the magnetic circuits 181, 191, and 201.

It is to be understood that the above-described arrangements are illustrative of the application of the principles of the invention. Numerous other arrangements may be devised by those skilled in the art without departing from the spirit and scope of the invention.

What is claimed is:

1. An electrical circuit comprising a magnetic core defining three magnetic circuits and having a pair of outer legs and a pair of inner legs, said inner legs being of larger cross section than said outer legs, means generating sufficient flux in said inner legs normally to saturate said outer legs without saturating said inner legs, an input winding and an output winding individually coupled to each of said magnetic circuits, a control winding on each of said inner legs, and means connecting said control windings in parallel so that a selection pulse of one polarity generates flux opposing the saturation flux of said one inner leg and a selection pulse of the other polarity generates a flux opposing the saturation flux of the other of said inner legs.

2. An electrical circuit in accordance with claim 1 comprising a common output circuit, said output windings being connected in series to common output circuit whereby a control pulse of one polarity gates an input pulse present at an input winding of one of the outer magnetic circuits to said output circuit, a control pulse of the opposite polarity gates an input pulse present at the input winding at the other of said outer magnetic circuits to said output circuit, and in the absence of a control pulse the input pulse present at an input winding of the middle of said magnetic circuits is gated to said output circuit.

3. An electrical circuit comprising a pair of magnetic cores each defining three magnetic circuits and each having a pair of outer legs and a pair of inner legs, said inner legs being of larger cross section than said outer legs, means generating sufficient magnetic flux in said inner legs normally to saturate said outer legs without saturating said inner legs, an input winding and three output windings individually coupled to each of said magnetic circuits of the first of said cores, an output winding and three input windings individually coupled to each of said magnetic circuits of the second of said cores, a control winding on each of said inner legs of said cores, input means connecting said control windings on each core in parallel so that a pulse of one polarity opposes the saturation flux of one of said inner legs and a pulse of the other polarity opposes the saturation pulse of the other of said inner legs for each of said cores, and means connecting said output windings of the said first core to the input windings of said second core so that an output winding of each of the magnetic circuits of said first core is connected to an input winding of each of the magnetic circuits of said second core.

4. A gating circuit comprising magnetic core means defining three magnetic circuits having certain elements defining paths common to two of said circuits and other elements defining paths distinct to each circuit, an input winding and an output winding coupled to each of said circuits and wound on path elements distinct to each circuit, means for generating a saturating flux in said common path elements sufficient to saturate said distinct path elements but insufficient to saturate said common path elements, said common path elements being of larger cross-sectional area than said distinct path elements, control windings coupled to said circuits and wound on said common path elements thereof, and means applying ternary control signals to said control windings to generate a flux canceling the saturating flux flowing in said common path elements whereby for any ternary value of said control signals one and only one of said three magnetic circuits is not saturated and can transmit ternary information appearing at an input winding thereof to the output winding thereof.

5. An electrical circuit comprising a magnetic core defining three magnetic circuits and having a pair of outer legs, a pair of inner legs of larger cross-sectional area than said outer legs, and end members connecting said legs, means for generating sufficient flux in said inner legs normally to saturate said outer legs without saturating said inner legs, said flux being in the same direction in said inner legs, an input winding and an output winding individually coupled to each of said magnetic circuits, and means for generating flux in either of said inner legs substantially to cancel the saturation flux therein in response to ternary valued signals.

6. An electrical circuit in accordance with claim 5 wherein said inner legs are at least twice the cross-sectional area of said outer legs.

7. An electrical circuit in accordance with claim 5 where said last-mentioned flux generating means includes means for generating cancellation flux in one of said inner legs in response to a positive signal and means for generating cancellation flux in the other of said inner legs in response to a negative signal.

8. An electrical circuit comprising magnetic means defining three magnetic circuits, said magnetic means including a first inner leg defining a path common to two of said circuits and a second inner leg defining a path common to two of said circuits, means for generating sufficient magnetic flux in said inner legs to saturate the two circuits each comprising only one of said legs, said inner legs being of larger cross-sectional area than the remainder of said magnetic circuit elements and not being saturated by the saturation flux therein and said saturation flux being in the same direction in said inner legs to cancel out in the magnetic circuit comprising both of said inner legs, an input and an output winding individually coupled to each of said magnetic circuits, and means including a control winding on each of said inner legs and a source of control pulses for generating a flux in opposition to said saturation flux in one of said inner legs on occurrence of a control pulse of one polarity and for generating a flux in opposition to said saturation flux in the other of said inner legs on occurrence of a control pulse of the opposite polarity.

No references cited.